United States Patent
Boersma et al.

(10) Patent No.: US 9,760,375 B2
(45) Date of Patent: *Sep. 12, 2017

(54) REGISTER FILES FOR STORING DATA OPERATED ON BY INSTRUCTIONS OF MULTIPLE WIDTHS

(71) Applicant: International Business Machines Corporation, Armonk, NY (US)

(72) Inventors: Maarten J. Boersma, Holzgerlingen (DE); Markus Kaltenbach, Holzferlingen (DE); David Lang, Tuebingen (DE); Jentje Leenstra, Bondorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 14/480,680

(22) Filed: Sep. 9, 2014

(65) Prior Publication Data

US 2016/0070574 A1    Mar. 10, 2016

(51) Int. Cl.
*G06F 15/00*  (2006.01)
*G06F 7/38*  (2006.01)
(Continued)

(52) U.S. Cl.
CPC ........ *G06F 9/30105* (2013.01); *G06F 9/3012* (2013.01); *G06F 9/30112* (2013.01);
(Continued)

(58) Field of Classification Search
None
See application file for complete search history.

(56) References Cited

U.S. PATENT DOCUMENTS

| 4,858,113 A | 8/1989 | Saccardi |
| 5,055,999 A | 10/1991 | Frank et al. |

(Continued)

FOREIGN PATENT DOCUMENTS

| CN | 101021778 A | 8/2007 |
| CN | 101676865 A | 3/2010 |

(Continued)

OTHER PUBLICATIONS

Chu et al., "Independent Mapping of Threads," U.S. Appl. No. 14/501,152, filed Sep. 30, 2014.

(Continued)

*Primary Examiner* — George Giroux
(74) *Attorney, Agent, or Firm* — Mitch Harris, Atty at Law, LLC; Andrew M. Harris; Steven L. Bennett

(57) ABSTRACT

A processor core includes even and odd execution slices each having a register file. The slices are each configured to perform operations specified in a first set of instructions on data from its respective register file, and together configured to perform operations specified in a second set of instructions on data stored across both register files. During utilization, the processor receives a first instruction of the first set specifying an operation, a target register, and a source register. Next, a second instruction upon which content of the source register depends is identified as being of the second set. In response, the first instruction is dispatched to the even slice. In accordance with the operation specified in the first instruction, the even slice uses content of the source register in its register file to produce a result. Copies of the result are written to the target register in both register files.

12 Claims, 4 Drawing Sheets

(51) Int. Cl.
*G06F 9/00* (2006.01)
*G06F 9/44* (2006.01)
*G06F 9/30* (2006.01)
*G06F 9/38* (2006.01)

(52) U.S. Cl.
CPC ........ *G06F 9/30138* (2013.01); *G06F 9/3828* (2013.01); *G06F 9/3836* (2013.01); *G06F 9/3887* (2013.01); *G06F 9/3891* (2013.01)

(56) References Cited

U.S. PATENT DOCUMENTS

| | | | |
|---|---|---|---|
| 5,095,424 | A | 3/1992 | Woffinden et al. |
| 5,471,593 | A | 11/1995 | Branigin |
| 5,475,856 | A | 12/1995 | Kogge |
| 5,553,305 | A | 9/1996 | Gregor et al. |
| 5,630,149 | A | 5/1997 | Bluhm |
| 5,680,597 | A | 10/1997 | Kumar et al. |
| 5,822,602 | A | 10/1998 | Thusoo |
| 5,996,068 | A | 11/1999 | Dwyer, III et al. |
| 6,044,448 | A | 3/2000 | Agrawal et al. |
| 6,073,215 | A | 6/2000 | Snyder |
| 6,073,231 | A | 6/2000 | Bluhm et al. |
| 6,092,175 | A | 7/2000 | Levy et al. |
| 6,112,019 | A | 8/2000 | Chamdani et al. |
| 6,119,203 | A | 9/2000 | Snyder et al. |
| 6,138,230 | A | 10/2000 | Hervin et al. |
| 6,145,054 | A | 11/2000 | Mehrotra et al. |
| 6,170,051 | B1 | 1/2001 | Dowling |
| 6,212,544 | B1 | 4/2001 | Borkenhagen et al. |
| 6,286,027 | B1 | 9/2001 | Dwyer, III et al. |
| 6,311,261 | B1 | 10/2001 | Chamdani et al. |
| 6,336,183 | B1 | 1/2002 | Le et al. |
| 6,356,918 | B1 | 3/2002 | Chuang et al. |
| 6,381,676 | B2 | 4/2002 | Aglietti et al. |
| 6,425,073 | B2 | 7/2002 | Roussel et al. |
| 6,463,524 | B1 | 10/2002 | Delaney et al. |
| 6,549,930 | B1 | 4/2003 | Chrysos et al. |
| 6,564,315 | B1 | 5/2003 | Keller et al. |
| 6,728,866 | B1 | 4/2004 | Kahle et al. |
| 6,732,236 | B2 | 5/2004 | Favor |
| 6,839,828 | B2 | 1/2005 | Gschwind et al. |
| 6,847,578 | B2 | 1/2005 | Ayukawa et al. |
| 6,868,491 | B1 | 3/2005 | Moore |
| 6,883,107 | B2 | 4/2005 | Rodgers et al. |
| 6,944,744 | B2 | 9/2005 | Ahmed et al. |
| 6,948,051 | B2 | 9/2005 | Rivers et al. |
| 6,954,846 | B2 | 10/2005 | Leibholz et al. |
| 6,978,459 | B1 | 12/2005 | Dennis et al. |
| 7,020,763 | B2 | 3/2006 | Saulsbury et al. |
| 7,024,543 | B2 | 4/2006 | Grisenthwaite et al. |
| 7,086,053 | B2 | 8/2006 | Long et al. |
| 7,114,163 | B2 | 9/2006 | Hardin et al. |
| 7,155,600 | B2 | 12/2006 | Burky et al. |
| 7,191,320 | B2 | 3/2007 | Hooker et al. |
| 7,263,624 | B2 | 8/2007 | Marchand et al. |
| 7,290,261 | B2 | 10/2007 | Burky et al. |
| 7,302,527 | B2 | 11/2007 | Barrick et al. |
| 7,386,704 | B2 | 6/2008 | Schulz et al. |
| 7,469,318 | B2 | 12/2008 | Chung et al. |
| 7,478,225 | B1 | 1/2009 | Brooks et al. |
| 7,512,724 | B1 | 3/2009 | Dennis et al. |
| 7,565,652 | B2 | 7/2009 | Janssen et al. |
| 7,600,096 | B2 | 10/2009 | Parthasarathy et al. |
| 7,669,036 | B2 | 2/2010 | Brown et al. |
| 7,694,112 | B2 | 4/2010 | Barowski et al. |
| 7,721,069 | B2 | 5/2010 | Ramchandran et al. |
| 7,793,278 | B2 | 9/2010 | Du et al. |
| 7,836,317 | B2 | 11/2010 | Marchand et al. |
| 7,889,204 | B2 | 2/2011 | Hansen et al. |
| 7,926,023 | B2 | 4/2011 | Okawa et al. |
| 7,975,134 | B2 | 7/2011 | Gonion |
| 7,987,344 | B2 | 7/2011 | Hansen et al. |
| 8,046,566 | B2 | 10/2011 | Abernathy et al. |
| 8,074,224 | B1 | 12/2011 | Nordquist et al. |
| 8,099,556 | B2 | 1/2012 | Ghosh et al. |
| 8,103,852 | B2 | 1/2012 | Bishop et al. |
| 8,108,656 | B2 | 1/2012 | Katragadda et al. |
| 8,135,942 | B2 | 3/2012 | Abernathy et al. |
| 8,141,088 | B2 | 3/2012 | Morishita et al. |
| 8,166,282 | B2 | 4/2012 | Madriles et al. |
| 8,250,341 | B2 | 8/2012 | Schulz et al. |
| 8,386,751 | B2 | 2/2013 | Ramchandran et al. |
| 8,412,914 | B2 | 4/2013 | Gonion |
| 8,464,025 | B2 | 6/2013 | Yamaguchi et al. |
| 8,489,791 | B2 | 7/2013 | Byrne et al. |
| 8,656,401 | B2 | 2/2014 | Venkataramanan et al. |
| 8,683,182 | B2 | 3/2014 | Hansen et al. |
| 8,713,263 | B2 | 4/2014 | Bryant |
| 8,966,232 | B2 | 2/2015 | Tran |
| 8,984,264 | B2 | 3/2015 | Karlsson et al. |
| 9,519,484 | B1 | 12/2016 | Stark |
| 2002/0035589 | A1* | 3/2002 | Saulsbury ............... G06F 7/505 708/700 |
| 2002/0049892 | A1* | 4/2002 | Saulsbury ........... G06F 9/30101 712/1 |
| 2002/0194251 | A1 | 12/2002 | Richter et al. |
| 2004/0111594 | A1 | 6/2004 | Feiste et al. |
| 2004/0216101 | A1 | 10/2004 | Burky et al. |
| 2004/0250053 | A1* | 12/2004 | McGrath ............ G06F 9/30189 712/229 |
| 2007/0022277 | A1 | 1/2007 | Iwamura et al. |
| 2008/0133885 | A1 | 6/2008 | Glew |
| 2008/0276072 | A1* | 11/2008 | Rychlik .............. G06F 9/30094 712/206 |
| 2008/0313424 | A1 | 12/2008 | Gschwind |
| 2009/0013151 | A1* | 1/2009 | Hara ................... G06F 9/30014 712/22 |
| 2009/0037698 | A1 | 2/2009 | Nguyen |
| 2009/0113182 | A1 | 4/2009 | Abernathy et al. |
| 2010/0100685 | A1 | 4/2010 | Kurosawa et al. |
| 2012/0110271 | A1 | 5/2012 | Boersma et al. |
| 2014/0215189 | A1 | 7/2014 | Airaud et al. |
| 2014/0244239 | A1 | 8/2014 | Nicholson et al. |
| 2015/0134935 | A1* | 5/2015 | Blasco ................... G06F 9/384 712/220 |

FOREIGN PATENT DOCUMENTS

| | | |
|---|---|---|
| CN | 101876892 A | 11/2010 |
| CN | 102004719 A | 4/2011 |

OTHER PUBLICATIONS

IBM, "List of IBM Patents or Patent Applications Treated as Related."
Boersma et al., "Register Files for Storing Data Operated on by Instructions of Multiple Widths," U.S. Appl. No. 14/574,644, filed Dec. 18, 2014.
U.S. Appl. No. 14/723,940, filed May 28, 2015, Eisen, et al.
U.S. Appl. No. 14/724,073, filed May 28, 2015, Brownscheidle, et al.
U.S. Appl. No. 14/724,268, filed May 28, 2015, Ayub, et al.
U.S. Appl. No. 14/501,152, filed Sep. 30, 2014, Chu, et al.
U.S. Appl. No. 14/869,305, filed Sep. 29, 2015, Chu, et al.
U.S. Appl. No. 14/274,942, filed May 12, 2014, Eisen, et al.
U.S. Appl. No. 14/302,589, filed Jun. 12, 2014, Eisen, et al.
U.S. Appl. No. 14/300,563, filed Jun. 10, 2014, Eisen, et al.
U.S. Appl. No. 14/594,716, filed Jan. 12, 2015, Eisen, et al.
U.S. Appl. No. 14/595,549, filed Jan. 13, 2015, Brownscheidle, et al.
U.S. Appl. No. 14/595,635, filed Jan. 12, 2015, Ayub, et al.
U.S. Appl. No. 14/574,644, filed Dec. 18, 2014, Boersma, et al.
U.S. Appl. No. 14/274,927, filed May 12, 2014, Eisen, et al.
Gebhart et al., "A Hierarchical Thread Scheduler and Register File for Energy-Efficient Throughput Processors", ACM Transactions on Computer Systems, vol. 30, No. 2, Article 8, Publication date: Apr. 2012, pp. 8:1-8:38, © 2012 ACM, <http://doi.acm.org/10.1145/2166879.2166882>.
"Method and system for Implementing "Register Threads" in a Simultaneously-Multithreaded (SMT) Processor Core", An IP.com

(56) References Cited

OTHER PUBLICATIONS

Prior Art Database Technical Disclosure, Authors et. al.: Disclosed Anonymously, IP.com No. IPCOM000199825D, IP.com Electronic Publication: Sep. 17, 2010, pp. 1-4, <http://ip.com/IPCOM/000199825>.

Czajkowski, et al., "Resource Management for Extensible Internet Servers", Proceedings of the 8th ACM SIGOPS European Workshop on Support for Composing Distributed Applications, Sep. 1998, pp. 33-39, ACM, Portugal.

Bridges, et al., "A CPU Utilization Limit for Massively Parallel MIMD Computers", Fourth Symposium on the Frontiers of Massively Parallel Computing, Oct. 19-21, 1992, pp. 83-92, IEEE, VA, US.

Eisen, L. et al., "Parallel Slice Processor with Dynamic Instruction Stream Mapping," U.S. Appl. No. 14/274,927, filed May 12, 2014.

Eisen, L. et al., "Parallel Slice Processor with Dynamic Instruction Stream Mapping," U.S. Appl. No. 14/300,563, filed Jun. 10, 2014.

Eisen, L. et al, Processing of Multiple Instruction Streams in a Parallel Slice Processor, U.S. Appl. No. 14/274,942, filed May 12, 2014.

Eisen, L. et al, Processing of Multiple Instruction Streams in a Parallel Slice Processor, U.S. Appl. No. 14/302,589, filed Jun. 12, 2014.

Pechanek, et al., "ManArray Processor Interconnection Network: An Introduction", Euro-Par' 99 Parallel Processing, Lecture Notes in Computer Science, 5th International Euro-Par Conference, Aug. 31-Sep. 3, 1999 Proceedings, pp. 761-765, vol. 1685, Spring Berlin Heidelberg, Toulouse, France.

Pechanek, et al., "The ManArray Embedded Processor Architecture",Proceedings of the 26th Euromicro Conference, IEEE Computer Society, Sep. 5-7, 2000, pp. 348-355, vol. 1, Maastricht.

Office Action in U.S. Appl. No. 14/574,644 mailed on Oct. 5, 2016, 36 pages (pp. 1-36 in pdf).

List of IBM Patents or Patent Applications Treated as Related, 3 pages.

U.S. Appl. No. 15/442,810, filed Feb. 27, 2017, Eisen, et al.

* cited by examiner

REGISTER FILES FOR STORING DATA OPERATED ON BY INSTRUCTIONS OF MULTIPLE WIDTHS

BACKGROUND

The present disclosure relates to processor cores, and more specifically, to the architecture and use of physical register files in processor cores having multiple execution slices.

In modern computer architecture, there are several known ways to design a single computer adapted to perform more than one instruction at a time, or at least in the same time frame. For example, such a computer may include more than one processor core (i.e., central processing unit) and each processor core may be capable of acting independently of other processor cores. This may allow for true multitasking, with each processor core processing a different instruction stream in parallel with the other processor cores of the computer. Another design to improve throughput may be to include multiple hardware threads within each processor core, with the threads sharing certain resources of the processor core. This may allow each processor core to take advantage of thread-level parallelism.

SUMMARY

According to embodiments of the present disclosure, aspects of the disclosure may include a processor core and a method of processing instructions in a processor core. In some embodiments, the processor core may include architecture with an even execution slice having an even physical register file and an odd execution slice having an odd physical register file. The even and odd execution slices may each be configured to perform operations specified in a first set of instructions on data from its respective physical register file, and together configured to perform operations specified in a second set of instructions on data stored across both the even and odd physical register files.

In some embodiments, during utilization, the processor core may receive a first instruction specifying an operation, a target register, and at least one source register. This first instruction may be of the first set of instructions. Next, a second instruction upon which content of the at least one source register depends may be identified. The processor core may determine that this second instruction is of the second set of instructions. In response to this determination, the first instruction may be dispatched to the even execution slice. The even execution slice may then be used to perform the operation specified in the first instruction. To perform this operation, it may use content of the at least one source register in the even physical register file to produce a result. A first copy of the result may then be written to the target register in the even physical register file, and a second copy of the result may be written to the target register in the odd physical register file.

In some embodiments, during utilization, the processor core may receive an instruction specifying an operation and at least one source register. This instruction may be of the second set of instructions. The processor core may detect that an indicator is set. In response to this detection, the processor core may treat content of the at least one source register in the odd physical register file as an undefined value for the purposes of the operation specified in the instruction. The even execution slice and the odd execution slice may then be used to perform this operation. The operation may be performed using content of the at least one source register in the even physical register file and the undefined value to produce a result.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
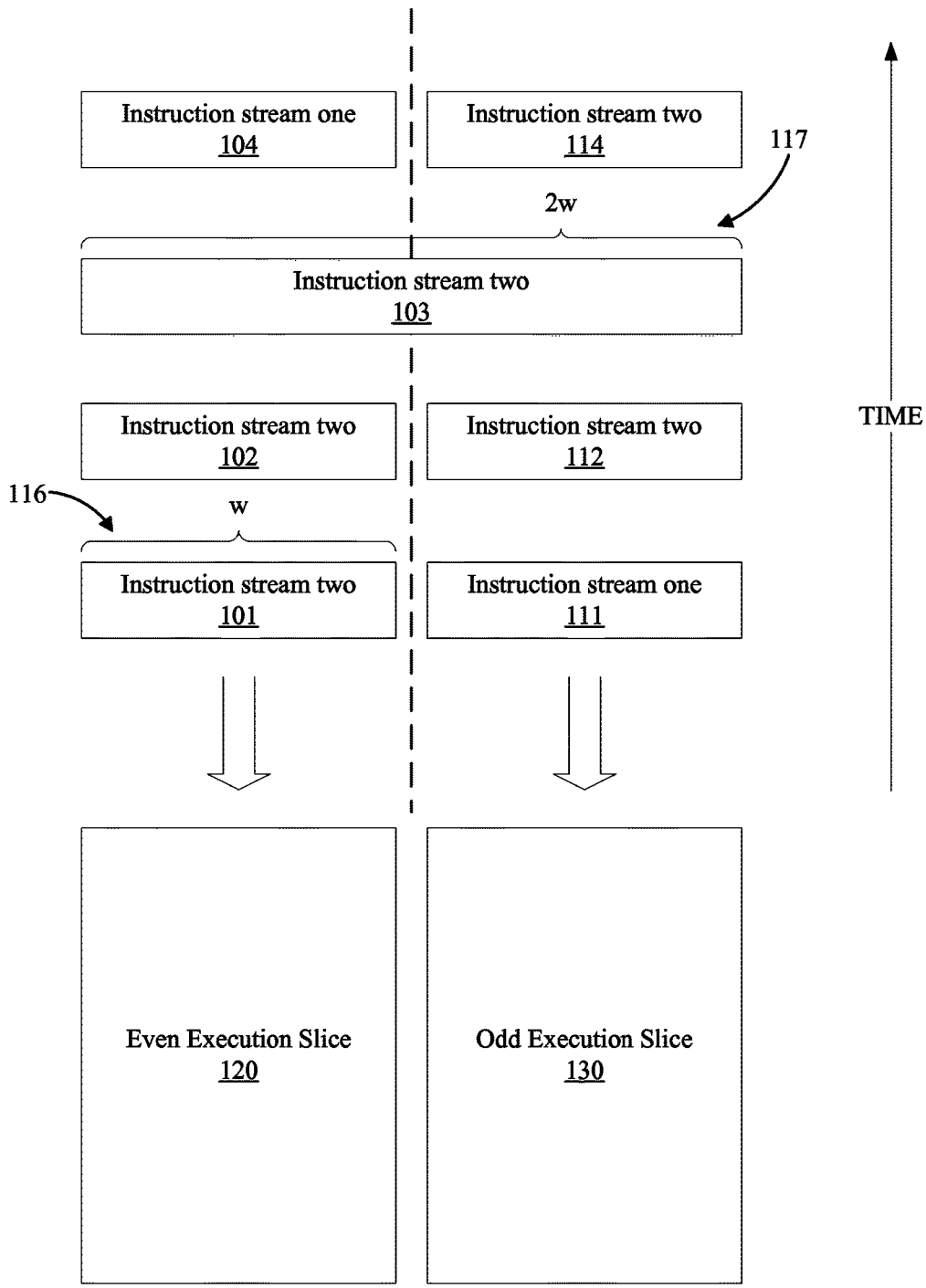
FIG. 1 illustrates a pictorial diagram showing the order of instructions being dispatched over time in an example processor core configured with two execution slices, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to processor cores. While the present disclosure is not necessarily limited to such applications, various aspects of the disclosure may be appreciated through a discussion of various examples using this context.

In some embodiments, a processor core may have multiple execution slices each having its own physical register file. As used herein, an execution slice may refer to a set of data processing hardware units connected in series within a processor core. An execution slice may be a pipeline or a pipeline-like structure. In some embodiments, multiple execution slices may be used as part of simultaneous multithreading within a processor core.

Furthermore, it is noted that the terms physical register file, physical register set, and physical register are used in this disclosure. The word "physical" has been added to each of these terms for the sake of clarity; specifically, the word may be used to identify a structural, hardware storage device that may be part of processor core architecture. This is contrasted with the term "logical register", which may be used to identify a register that can be mapped onto a physical register.

According to embodiments of the present disclosure, the instruction set architecture for a processor core may be configured to perform operations on data stored in logical registers having different sizes. For instance, a first set of instructions may specify operations to be performed on data from logical registers that are 64 bits wide, while a second set of instructions may specify operations to be performed on data from logical registers that are 128 bits wide. Further, in some embodiments, the physical registers to which these logical registers are mapped may all be of one size. For example, each 64-bit logical register may be mapped to a single 64-bit physical register, and each 128-bit logical register may be mapped across two corresponding 64-bit physical registers. Moreover, in some embodiments, at least some of the smaller (64-bit) logical registers (e.g., scalar registers) may share registers with the lower portions of corresponding larger (128-bit) logical registers (e.g., vector registers). For example, a vector register may serve as a 64 bit extension of a scalar register (e.g., both registers share bits 0-63, but the vector register includes additional bits 64-127 that are not shared with that scalar register). It is noted that while the particular examples of 64 bits and 128 bits are used, the embodiments described herein are not necessarily limited to these register sizes.

In some embodiments of the present disclosure, a single processor core may include two execution slices that are each configured to individually perform operations on data specified in instructions of a first set of instructions (e.g., those instructions specifying operations having the smaller/scalar data widths and corresponding to the widths of single execution slices). The two slices can also be configured as work as a pair in order to perform operations specified in instructions of a second set of instructions (e.g., those instructions specifying operations having the larger/vector data widths and corresponding to the widths of two execution slices). Because processing a given instruction of the first set may be carried out by a single execution slice, either execution slice may be used in some circumstances. In order to be able to use either slice, however, a copy of the data to be operated on by the instruction may need to be stored in the physical register files of both execution slices (i.e., a duplicate copy may need to be stored in the physical register file of each execution slice).

For registers corresponding to the second set of instructions, the upper bits (e.g., bits 64-127) can be processed by a single one of the slices and not in the other slice. Thus, only one copy of the upper bits may need to be stored in the physical register files because there may be only one way to process such an instruction (i.e., the operation is dispatched across both execution slices in a particular order).

There may be alternative ways to configure physical register files of execution slices adapted to perform both sets of operations. In one alternative, the physical register file of a first execution slice (referred to herein as an even execution slice) may be configured to map the lower bits of 128-bit logical registers and the entirety of 64-bit logical registers to a single, common, set of physical registers. The physical register file of a second (odd) execution slice may contain at least two sets of physical registers, with one set of physical registers holding a duplicate copy of the corresponding set of physical registers of the even execution slice and another set of physical registers holding the upper bits of the larger/128-bit logical registers. When operations are performed on either only the lower bits of the 128-bit logical registers or the entirety of 64-bit logical registers, then the upper bits (as stored in one of the physical register sets of the odd execution slice) no longer contain valid data. In some embodiments, this invalid data may be the equivalent of undefined values for the purposes of this disclosure.

In another alternative configuration of a processor core having two execution slices, the second (odd) execution slice may be configured to use each physical register for storing either (i.e., one of) the upper bits of a 128-bit logical register or the entirety of a 64-bit logical register. In this manner, there is a reduced number of physical registers that are needed in the physical register file of the odd execution slice. In addition to logic relating to dispatching instructions, such a processor core may include an indicator (or set of indicators) that identifies whether or not a given shared physical register of the odd slice has valid data for the upper bits of a larger/128-bit logical register (as opposed to a copy of a 64-bit logical register). Override logic can then emulate undefined values as necessary (e.g., by reading all zeroes for the upper bits in the case of a 128-bit instruction). For ease of discussion, the following examples assume that the first set of instructions and logical registers is 64 bits wide and the second set is 128 bits wide. Other bit sizes are possible.

In some embodiments where reading out predefined values (like all zeros or all ones) for the undefined bits may be aided by the use of override logic, the override logic may also act as a security measure. For example, override logic may prevent the data written by a 128-bit instruction of a particular thread from being read by another thread running on the same core and having written a 64-bit result in the same physical register. The override logic is this case may insure that all zeros are read from the register instead of the actual content written by the 128-bit instruction of the first thread. Furthermore, in some embodiments, software applications can make use of knowing that the undefined bits will be set to a predefined value and avoid the need to have additional instructions to set these bits explicitly to an initial value.

Consistent with embodiments, the instruction dispatch logic can be configured to dispatch instructions based upon the dependency of the source registers for a current instruction. For example, the dispatch logic may determine that the current instruction is an instruction that is of the first (smaller data width) set of instructions. It may then determine if the immediately prior operation for any of the source registers was for the second set of instructions. If so, this means that the source register in the odd execution slice does not contain a duplicate of a 64-bit register of the even execution slice. This is due to the prior operation writing 128 bits, the lower 64 bits to the even slice and upper 64 bits to the odd slice. In such a case, the dispatch logic may be configured to dispatch the current instruction to the even slice, rather than the odd slice. If the prior operations were not for the second set of instructions, however, the current instruction may be dispatched to either slice. According to embodiments, the dispatch logic may also determine that the current instruction is for the second set of (128-bit) instructions. In this case, the instruction is dispatched across both slices.

Consistent with embodiments, the system can include an override circuit that is configured to override the contents of a physical register of the odd slice when the upper 64 bits are undefined. As discussed herein, an indicator bit can be used to indicate whether or not the upper bits are undefined. If the upper bits are indicated as undefined, and the current instruction is for a 128 bit operation, the override circuit can generate an undefined value, regardless of the actual contents of that physical register. If the upper bits are not indicated as undefined, the override circuit can allow the contents of that physical register to be used in the operation. In some embodiments, the override circuit may be configured using AND gate logic that gates each bit of a physical register based on upon the setting of the register's corresponding indicator bit. During a read operation, this may cause, for example, each of the 64 bits of the physical register to be read as zero if the indicator bit is set or read as its actual value if the indicator bit is cleared.

According to embodiments, the results of various operations can be written back to both the even and odd slices and the undefined indicator bit can be set and reset. For instance, when a 128-bit operation is performed, the lower 64 bits can be written to the register file of the even slice and the upper 64 bits can be written to the register file of the odd slice. In addition, an undefined indicator bit can be cleared. When a 64-bit operation is performed, a copy of the 64-bit result can be stored in both the even and odd slices and an undefined indicator bit can be set.

In some embodiments, a processor core with multiple execution slices may offer a wide range of options for processing instructions. For example, by having more than one execution slice, a single processor core may be able to use multiple execution slices separately to execute multiple instructions simultaneously (either from the same or different instruction streams) or use multiple execution slices together to execute a single instruction at a time. In some embodiments, this use of multiple execution slices together on a single instruction may allow for larger data widths to be operated on.

In some embodiments, the override logic may be used to detect that a dispatched instruction has no valid source data. This may occur, for example, where the dispatch of the instruction was speculative and, for cycle time reasons, the dispatch logic was not able to cover all of the conditions to insure that the instruction would be dispatched to an execution slice having all of the necessary source data. In such situations, the override logic may be able to cover the conditions not covered by the dispatch logic, detect that an appropriate operand cannot be read, and respond accordingly. For example, if a 64-bit instruction is dispatched on an odd slice and the override logic indicates that the operands required for that instruction have not been copied into the appropriate physical register file for that slice, then a flush request can be generated, and the instruction may be later re-dispatched to an even slice. In some embodiments, however, this speculative dispatching and flushing instructions may not be good for obtaining optimal performance.

Turning now to FIG. 1, a pictorial diagram illustrating these concepts is provided. Shown in the diagram is the order of instructions being dispatched over time in an example processor core having two execution slices 120 and 130, in accordance with embodiments of the present disclosure. As illustrated, there are seven instructions 101, 102, 103, 104, 111, 112, and 114 being dispatched to the execution slices 120, 130. Three of the instructions (instructions 101, 102, and 104) are being dispatched to an even execution slice 120, another three of the instructions (instructions 111, 112, and 114) are being dispatched to an odd execution slice 130, and one of the instructions (instruction 103) is being dispatched across the even and odd execution slices 120, 130. It is noted that while the diagram of FIG. 1 depicts instructions being dispatched to each of execution slices 120 and 130 at the same time, it is contemplated that this may not always occur, and in some instances the dispatching of some instructions may become staggered as other instructions are executed.

As shown in the diagram of FIG. 1, the dispatched instructions may have various data widths. For example, the instruction 101 is depicted as being of width w, per reference numeral 116. In some embodiments, the width w may be 64 bits, and instruction 101 may be a 64-bit instruction. This is contrasted against the instruction 103 which is depicted as being of width 2w, per reference numeral 117. In some embodiments, the width of 2w may be 128 bits, and instruction 103 may be a 128-bit instruction. Also as shown in the diagram, instructions from different instruction streams may be executed at the same time using different execution slices. Specifically, an instruction 101 from instruction stream two may be dispatched to even execution slice 120 at the same time an instruction 111 from instruction stream one is being dispatched to odd execution slice 130. Next, the diagram depicts different instructions from the same instruction stream being executed at the same time. Specifically, an instruction 102 from instruction stream two may be dispatched to the even execution slice 120 at the same time instruction 112, also from instruction stream two, is dispatched to the odd execution slice 130. As discussed herein, instruction 112 can be dispatched into the odd execution slice 130 if the dispatch logic determines that the source registers for the corresponding operation do not depend upon the results of a 2w (e.g., 128-bit) instruction. This is because such a 128-bit instruction would have written the upper 64 bits of its result to the odd execution slice, rather than the lower 64 bits (which are the bits that are actually relevant for instruction 112).

Next, the diagram depicts a single instruction being dispatched across multiple execution slices. As illustrated, an instruction 103 from instruction stream two may be dispatched to both execution slices 120 and 130. As discussed above, this dispatching of a single instruction across two execution slices may be useful in many situations. For example, using two execution slices together may be useful in processing instructions requiring operands with widths greater than that of a single execution slice. For another example, using multiple execution slices together may be useful in processing instructions that require multiple data sets per instruction, such as in single instruction multiple data (SIMD) instructions. As discussed herein, the odd slice 130 can include an override circuit that is configured to override the contents of a register file if an undefined indicator is set.

Next, the diagram depicts the execution slices 120 and 130 being used, once again, on separate instructions, as even execution slice 120 may be dispatched an instruction 104 from instruction stream one, and odd execution slice 130 may be dispatched a separate instruction 114 from instruction stream two. This is an example of execution slices 120 and 130 being used on separate instructions once their combined processing width is no longer needed for single instructions. In some embodiments, such switching between widths of instructions dispatched to execution slices may be performed on a per instruction basis. In addition, it is further contemplated that, in some embodiments, processor cores may be configured to have a larger number of execution slices and/or a larger number of instruction streams being executed contemporaneously in these execution slices.

In some embodiments, processor cores may be configured to handle the varied types of dispatches illustrated in FIG. 1. Some considerations in configuring such processor cores may relate to short term memory storage. More specifically, as the number of instruction streams which a given execution slice may be used to process in any given time frame increases, there may be a corresponding increase in the amount of information which that execution slice must store in its physical register file. For example, in order to execute instructions from either of the two instruction streams shown in FIG. 1, the physical register files for both execution slices 120 and 130 may each need to maintain certain data for both instruction streams one and two. This may require a large amount of physical register file space in each execution slice. In addition, another consideration related to short term memory storage in these processor cores may be the size of their history buffers. In some embodiments, when speculative execution (e.g., branch prediction) is implemented, a history buffer may be employed to store prior register file states and thereby allow for recovery from mispredictions. The size of the history buffer in a processor core may depend on the number of streams being executed contemporaneously in the processor core as a whole.

Figure 2:
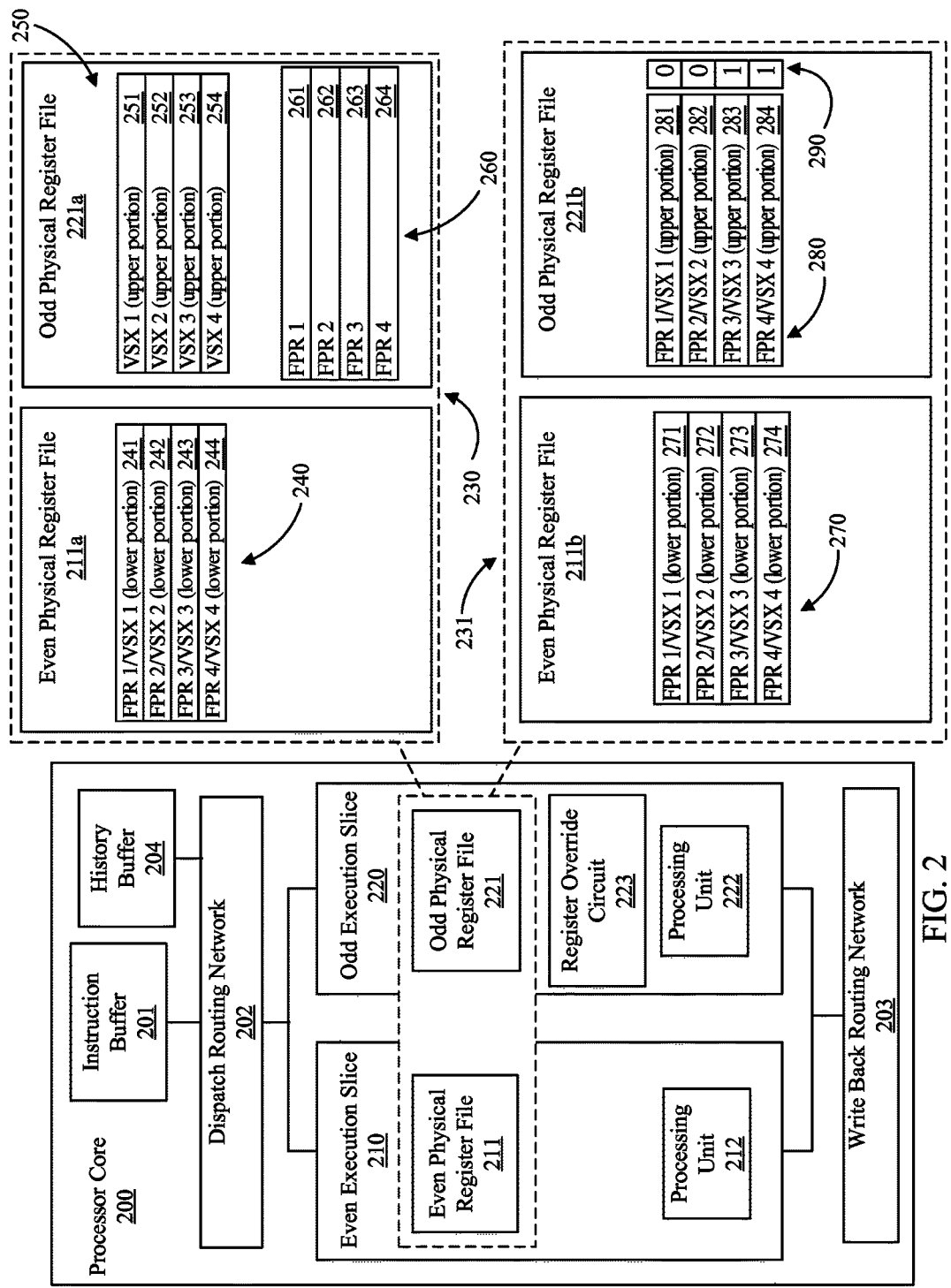
FIG. 2 illustrates a block diagram of an example processor core configured with two execution slices, in accordance with embodiments of the present disclosure.

Turning now to FIG. 2, shown is block diagram of an example processor core 200 configured with two execution slices 210 and 220, in accordance with embodiments of the present disclosure. The illustrated embodiment includes two alternative configurations of the physical register files 211 and 221 of these execution slices. As shown, the processor core 200 may include instruction buffer 201, dispatch routing network 202, execution slices 210 and 220, write back routing network 203, and history buffer 204. During use of the processor core 200, the instruction buffer 201 may act as an instruction queue that receives instructions and then groups or reorders them as needed to promote efficient processing (e.g., through out-of-order execution). The instruction buffer 201 may determine both the timing as to when instructions are dispatched to execution slices 210 and 220 and the execution slice to which any given instruction is sent (i.e., to either even execution slice 210, odd execution slice 220, or both). At the designated time, the dispatch routing network 202 may dispatch a given instruction to the designated execution slice. As discussed in more detail herein, the execution slices 210 and/or 220 may then process the instruction. Once processed, the result of the instruction may be transferred through write back routing network 203, and written to designated physical registers within physical register files 211 and 221. As discussed in more detail herein, history buffer 204 may store backups of data in situations where speculative execution (e.g., branch prediction) are implemented.

Within even execution slice 210, the even physical register file 211 and one or more processing units 212 may be included. The even physical register file 211 may serve to store data to be operated on using an operation specified by an instruction dispatched to even execution slice 210. The processing unit 212 may perform the operation specified by an instruction dispatched to even execution slice 210. Processing unit 212 may include, for example, one or more of an arithmetic logic unit, a floating-point unit, or other operation-processing circuits. The result of an operation performed by processing unit 212 may be written to the designated target register (or target registers) in even physical register file 211 and potentially elsewhere as well. Having similar architecture to even execution slice 210, odd execution slice 220 may also include an odd physical register file 221 and one or more processing units 222. In addition, odd execution slice 220 may also include a register override circuit 223. As discussed in more detail herein, when one or more indicators are set, the register override circuit 223 may serve to override the content of one or more physical registers of odd physical register file 221 for the purposes of certain instructions in order to emulate an undefined value within the physical register.

In some embodiments, processor core 200 may be adapted to process at least two different sets of instructions, with each set having instructions with widths that are different from the widths of instructions of the other set. In particular, some embodiments may be adapted to process a first set of instructions that are the same width as (or at least no greater than the width of) its execution slices 210 and 220 and a second set of instructions that are twice the width of (or at least wider than) its execution slices 210 and 220. For example, a processor core 200 having two 64-bit execution slices 210 and 220 may be configured to process both 64-bit instructions and 128-bit instructions. Likewise, the physical register files 211 and 221 in such embodiments may have physical registers that are the same width as the corresponding execution slices 210 and 220, respectively. For example, a physical register file 211 in a 64-bit execution slice 210 may include 64-bit physical registers. In some embodiments, these physical registers may also be extended so as to include error correction code or parity bits, which may aid in the checking and repair of data.

In some embodiments of a processor core 200 having two execution slices 210 and 220, instructions of the first set (i.e., requiring only one execution slice) may, in some circumstances, be dispatched to either execution slice 210 or execution slice 220. By allowing a single instruction to be processed by either one of two execution slices 210 or 220, a processor core 200 may be able to increase the rate at which it processes instruction streams. This rate increase may be created in situations where an instruction stream may be able to shift from a busy or already allocated one of execution slices 210 or 220 to a free one of execution slices 210 or 220 and thereby optimize the use of both execution slices 210 and 220. To allow for single instructions of the first set to be dispatched to either one of two execution slices 210 or 220, each execution slice 210 and 220 may need to contain a copy of data that corresponds to these instructions (e.g., duplicates of 64-bit operands may be stored in the each of 64-bit execution slices 210 and 220). The results of these operations may also be written back to both execution slice 210 and execution slice 220; this may allow future instructions of the same instruction stream to be dispatched to either execution slice 210 or execution slice 220. To explain another way, in order for either of two execution slices to operate on a set of data, each execution slice may need to store its own copy of that data set.

Likewise, in some embodiments of a processor core 200 having two execution slices 210 and 220, instructions of the second set (i.e., requiring both execution slice 210 and execution slice 220) may be dispatched across both execution slices 210 and 220. In such embodiments, data to be operated on by single instructions may be split between the two physical register files 211 and 221, with the lower portion of each data being stored in the even physical register file 211 (and operated on by processing unit 212 of the even execution slice 210), and the upper portions of each data being stored in the odd physical register file 221 (and operated on by processing unit 222 of the odd execution slice 211). For example, the lower 64 bits of a 128-bit operand may be stored in an even execution slice 210 and the upper 64 bits of the operand may be stored in an odd execution slice 220. The results of the operations specified in these instructions of the second set may be stored in the same manner.

Blocks 230 and 231 show two examples of physical register files and their corresponding mappings to the same set of logical registers. In block 230, logical floating point registers (FPR) represent a set of 64-bit logical registers. A copy of the FPR registers is stored in physical register sets 240 and 260. This allows for instructions operating on the FPR registers to be issued to either of one the even execution slice 211a or the odd execution slice 221a. Also in block 230, logical vector registers VSX represent extension registers to the FPR registers. In particular, the VSX registers share their lower 64 bits with the FPR registers, but also allow for 128-bit operations. Physical registers of physical register set 250 are used to store the upper 64 bits of the VSX registers.

In block 231, the same set of logical registers for FPR and VSX are supported. The physical register file 211*b* of the even slice 210 is mapped in the same manner as block 230. Physical register file 221*b* of the odd slice 220, however, maps the upper 64 bits of the VSX registers to the same physical register set 280 as the copies of the FPR registers. As discussed in more detail herein, this sharing is facilitated by the use of (undefined) indicator bits 290.

Returning back to block 230, understanding how the configuration of block 230 may operate may be aided by reviewing the example registers 241-244, 251-254, and 261-264. In this example, floating point registers (FPR's) of the processor core 200 are depicted as the smaller/scalar registers that are overlaid upon the lower portions of the larger/vector registers that are depicted in this configuration as VSX registers. More specifically, within physical register set 240 of even physical register file 211*a*, VSX registers 1 to 4 (lower portions) share physical registers 241-244 with the corresponding ones of FPR's 1 to 4. This is contrasted against the physical register sets 250 and 260 of odd physical register file 221*a*, wherein the VSX registers 1 to 4 (upper portions) are not mapped to the same physical registers as the FPR's 1 to 4. During use of the processor core 200 having the configuration of block 230, the usage of physical registers 251-254 and 261-264 may vary depending on whether operations specify FPR's or VSX registers. For example, if an operation specified in a scalar instruction (e.g., one that is dispatched to either even execution slice 210 or odd execution slice 220) has FPR 1 as a target register then a first copy of the result of the operation may be written to physical register 241, a second copy of the result may be written to physical register 261, and physical register 251 may be set to an undefined value (e.g., all zeroes) because an FPR is specified rather than a VSX register. On the other hand, to use a different example, if an operation specified vector instruction (e.g., one that is dispatched to both execution slices) has VSX 1 as a target register then the lower portion of the result of the operation may be written to physical register 241, the upper portion of the result may be written to physical register 251, and physical register 261 may be set to an undefined to value because a VSX register rather than an FPR is specified in the operation.

Turning now to block 231 of FIG. 2, a different configuration of the physical register files 211 and 221 is shown (with the physical register files being labeled as 211*b* and 221*b*). In a processor core 200 incorporating the configuration of block 231, any data that may be operated on by an execution slice 210 or 220 may be stored in a single physical register set of the physical register file corresponding to that execution slice. In other words, no matter whether the data may be operated on by an operation of the first set of operations (i.e., across only one execution slice) or an operation of the second set of operations (i.e., across both an odd and even execution slice), the data may still be stored in the same set of physical registers within each physical register file 211*b* and 221*b*.

In the example configuration of block 231, the FPR's are once again depicted as the smaller/scalar registers and the larger/vector registers are depicted by VSX registers. Like the configuration of block 230, this configuration of block 231 depicts the lower portions of the VSX registers as being overlaid on the FPR's. Unlike the configuration of block 230, however, this configuration of block 231 also depicts the upper portions of the VSX registers as being overlaid on the other, mirrored set of FPR's. Specifically, within physical register set 270 of even physical register file 211*b*, VSX registers 1 to 4 (lower portions) may share physical registers 271-274 with the corresponding ones of FPR's 1 to 4. Similarly, within physical register set 280 of odd physical register file 221*b*, VSX registers 1 to 4 (upper portions) may share physical registers 281-284 with corresponding ones of FPR's 1 to 4.

In addition, in the configuration of block 231, an indicator column 290 may be included. This indicator column 290 may have an indicator bit corresponding to each of physical registers 281-284. Each indicator bit of column 290 may serve to signal whether the corresponding physical register 281-284 contains data that may be a duplicate of the data contained in one of the physical registers 271-274 of physical register set 270 (i.e., it may signal that the physical register is being used to store data from FPR's rather than VSX registers). In some embodiments, a set indicator bit may indicate that duplicate copies of data are stored in a physical register 271-274 and a corresponding physical register 281-284, while a cleared indicator may indicate that the content of the relevant physical register 271-274 may not be a duplicate of a corresponding physical register 281-284 (i.e., that the physical register is being to store data from VSX registers).

An example of the use of the configuration of block 231 in storing data from operations specifying different register types may aid in the understanding of that configuration. As shown, physical registers 271-274 and 281-284 may hold either portions of larger/vector registers or smaller/scalar registers. For example, if an operation specifying a vector instruction (e.g., two execution slices) has VSX 1 as a target register then the lower portion of the result may be written to physical register 271 and the upper portion of the result may be written to physical register 281. In addition, because the content of physical register 281 is not a duplicate of the physical register 271, the indicator bit in column 290 corresponding to physical register 281 may be cleared (e.g., as shown by the "0" value in the appropriate row of column 290). To use a different example, if a different operation specifying a scalar instruction (e.g., one execution slice) has FPR 1 as a target register then a first copy of the result may be written to physical register 271 and second copy of the result may be written to physical register 281. In addition, because the content of physical register 281 is a duplicate of the content of physical register 271, the corresponding indicator bit may be set (e.g., as would be shown by a "1" value in the appropriate row of column 290). In some embodiments, physical register files as arranged in the configuration of block 231 may use relatively few register entries, which may translate into smaller physical register files, less power consumption, and better cycle times for reading out from the register files.

While only a few physical registers are shown in the physical register files of FIG. 2, it is contemplate that, in some embodiments, there may be multiple physical register files linked to a given execution slice, and there may be multiple physical register sets within each physical register file. Each physical register set may also contain any number of physical registers. In addition, it is contemplated that some embodiments may be hybrids between the embodiments of block 230 and block 231, and may include physical register sets of the configurations shown in both embodiments. Furthermore, in some embodiments, some physical register files may include physical register sets that do not correspond with any physical register sets in another execution slice. In such embodiments, whether a physical register set corresponds with another physical register set may depend on the type of registers that are within each set. For example, some embodiments may include FPR's that are mapped to the lower portion of VSX registers, while physical registers for general purpose registers are not overlaid by any other registers. Furthermore, in some embodiments, corresponding physical registers in differing physical register files may not be adjacent to each other (e.g., physical register 271 may correspond with physical register 283 rather than with physical register 281).

Figure 3:
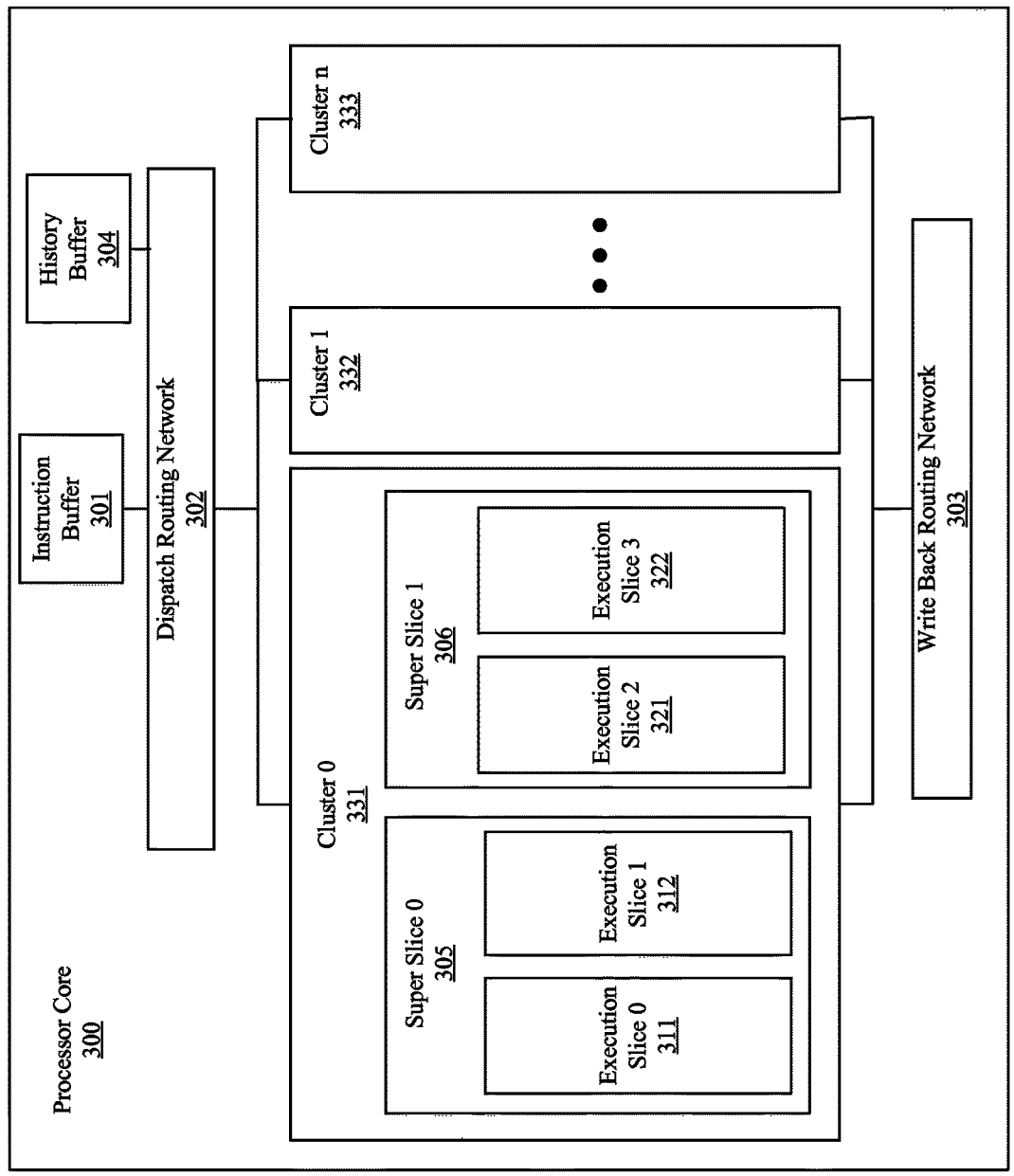
FIG. 3 illustrates a block diagram of an example processor core with multiple execution slices grouped into super slices, which super slices are themselves grouped into clusters, in accordance with embodiments of the present disclosure.

In some embodiments, processor cores may have several execution slices or even multiple sets of execution slices. Turning now to FIG. 3, shown is a block diagram of an example processor core 300 with multiple execution slices grouped into multiple super slices, which are themselves grouped into multiple clusters, in accordance with embodiments of the present disclosure. As used herein, a super slice may refer to a set of two or more execution slices in a processor core that may be configured to be used together to perform a single operation. Also, as used herein, a cluster may refer to a group of super slices that share a set of one or more instruction streams. In some embodiments, by sharing sets of instruction streams on a cluster-level (i.e., rather than processing all instruction streams in all execution slices), a processor core may be able to reduce the amount of duplicate information that must be stored in physical register files and reduce the overall amount of information that must be stored in a history buffer.

In the illustrated embodiment, an instruction buffer 301, dispatch routing network 302, write back routing network 303, and history buffer 304 are depicted, along with super slices 305 and 306, and clusters 331-333. Super slice 305 may include two execution slices 311 and 312. In some embodiments, execution slices 311 and 312 may be constructed and operate similarly to execution slices 210 and 220 of FIG. 2, respectively, with each execution slice 311 and 312 being configured to perform a first set of operations individually and a second set of operations together.

The other depicted super slice, super slice 306, may be similar to super slice 305 and may include execution slices 321 and 322. Together super slices 305 and 306 may form cluster 331. The other depicted clusters, clusters 332 and 333, may be similar to cluster 331 and may, in some embodiments, each include four execution slices grouped into two super slices.

Further, as is represented by cluster 333, a processor core 300 may, in some embodiments, include any number of clusters. In some embodiments, each cluster within a processor core may include a different set of instruction streams from the other clusters within the processor core. For example, processor core 300 may include six instruction streams, with cluster 331 processing instructions from streams one and two, cluster 332 processing instructions from streams three and four, and cluster 333 processing instructions from streams five and six. To continue the example, within cluster 331, each of the execution slices 311, 312, 321, and 322 may be configured to perform some operations individually as specified in instructions from either stream one or stream two. And because they are part of the same super slices, execution slices 311 and 312 and execution slices 321 and 322 may be configured to perform operations together (once again, as specified in instructions from either stream one or stream two).

Furthermore, it is contemplated that in some embodiments, a processor core may have a super slice with four or more execution slices. In such embodiments, each of four execution slices may be configured to perform a first set of operations individually, a second set of operations that extend across both that execution slice and one other execution slice of its same super slice, and a third set of operations that extend across both that execution slice and all three of the other execution slice of its same super slice.

Furthermore, it is contemplated that in some embodiments, a processor core may effectively have all of its execution slices be part of one cluster. In such embodiments, there may be a wide variety of possibilities for using execution slices together for performing various operations within the processor core and instructions from any of the instruction streams may be dispatched to any of the execution slices.

Figure 4:
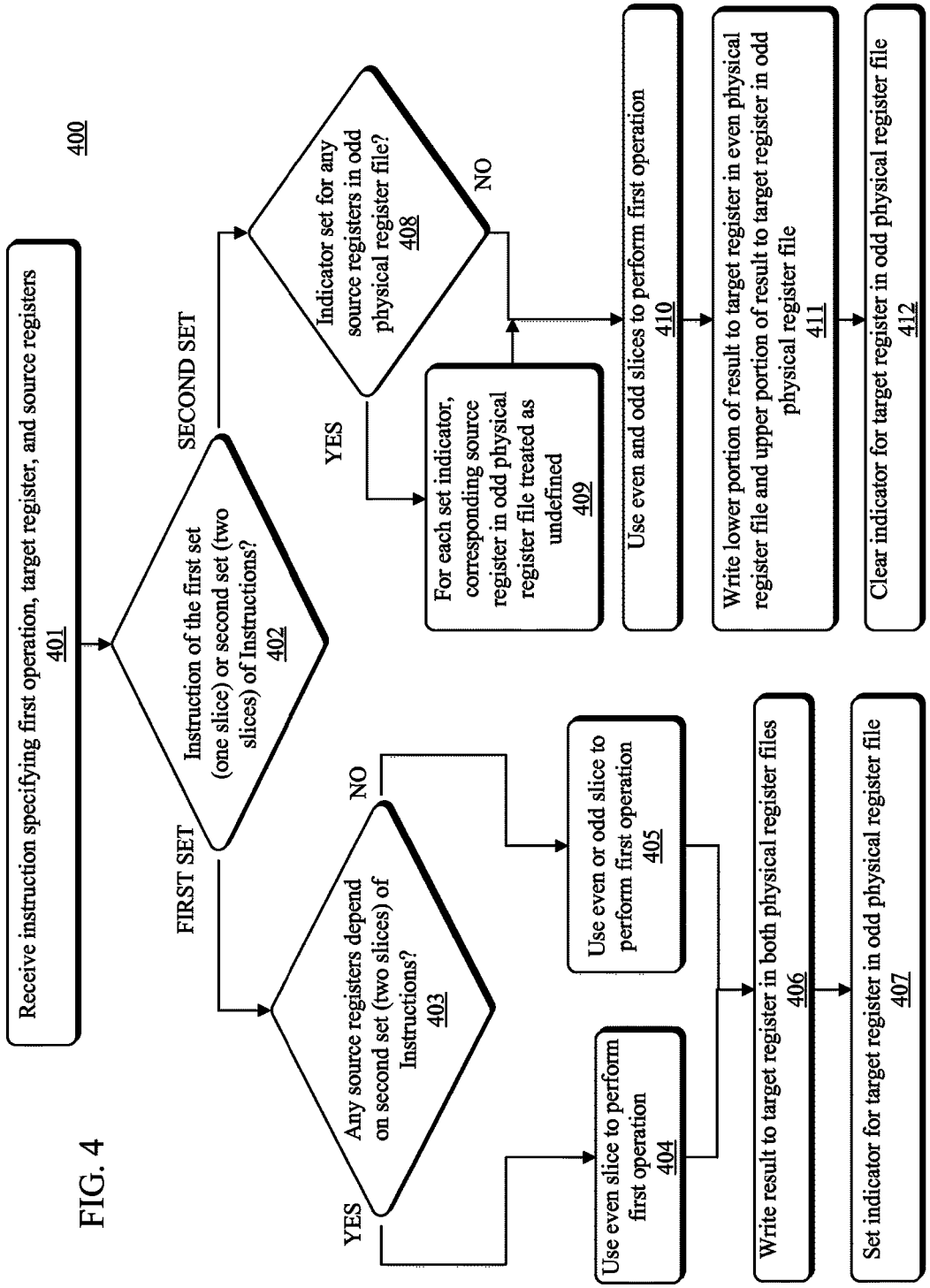
FIG. 4 illustrates a flowchart of an example method of processing instructions using a processor core with at least two execution slices, in accordance with embodiments of the present disclosure.

Turning now to FIG. 4, shown is a flowchart of a method 400 of processing instructions using a processor core with at least two execution slices (i.e., an even execution slice and an odd execution slice), in accordance with embodiments of the present disclosure. In some embodiments, method 400 may be performed by using logic circuitry that is configured to perform one or more steps of the method. The method may begin at block 401 with an instruction being received at a processor core. The instruction may specify a first operation, a target register, and source registers. Per decision block 402, a determination may be made as to whether the first instruction is of a first set of instructions or of a second set of instructions. As used herein, the first set of instructions may refer to those instructions that specify operations that may be performed by a single execution slice (i.e., an even execution slice or an odd execution slice) relying on data from its respective physical register file. Similarly, as used herein, the second set of instructions may refer to those instructions that specify operations that may be performed by two execution slices together (i.e., both an even execution slice and an odd execution slice) relying on data stored across both of their respective physical register files.

If in decision block 402 it is determined that the first instruction is of the first set of instructions, then, per decision block 403, a determination may be made as to whether any of the source registers for the first operation have content that depends (directly) upon any instructions that are of the second set of instructions (i.e., instructions that specify operations that require two execution slices for their performance). In making this particular determination, if a given instruction has two source registers and one of the source registers depends on the result of an instruction dispatched across two execution slices together, then it may not matter (for the purposes of decision block 403) whether the other source register depends on the result of another instruction dispatched to only one execution slice. In some embodiments, the dependency of source registers may be determined using a dependency check within an instruction buffer. In such a dependency check, at the time a given instruction is written into the instruction buffer, the sources registers of the given instruction may be compared with the target registers of the other instructions already allocated in the instruction buffer. Based on this comparison, all of the instructions having target registers matching up to each source register of the given instruction may be compiled. Next, an age macro may filter the results in order to determine which of the instructions matched to each source register is the youngest. The width of the youngest instruction targeting each source register may then be determined.

Continuing method 400, if in decision block 403, it is determined that none of the source registers for the first operation have content that depends upon any operations that are specified by instructions of the second set of operations, then, per block 405, either the even execution slice or the odd execution slice may be used to perform the first operation. In all other relevant situations, per block 404, the even execution slice, rather than the odd execution slice, may be used to perform the first operation. It is noted that the selection between using the even or odd execution slices in block 405 may be made based on a number of factors, including whether one of the execution slices is currently busy while the other execution slice is available.

Next, per block 406, regardless of whether the even execution slice performs the first operation (per 404 or 405) or the odd execution slice performs the first operation (per 405), the result of the first operation may be written to the target register in the physical register files corresponding to both execution slices (i.e., a first copy of the result may be written to the target register in the even physical register file and a second copy of the result may be written to the target register in the odd physical register file). Finally, per block 407, an indicator may be set for the target register in the odd physical register file. The indicator may include anything that is suitable for serving as a signal that the content of the target register in the odd physical register file is a duplication of the content of the target register in the even physical register file. In some embodiments, this indicator may include an indicator bit, such as the ones depicted in column 290 of FIG. 2.

Returning now to decision block 402, if it is determined that the first instruction is of the second set of instructions (i.e., requires two execution slices), then, per decision block 408, a determination may be made as to whether indicators are set for any of the source registers in the odd physical register file. As discussed above, each indicator may serve to signal that a corresponding physical register contains content that is a duplication of the content of a related physical register in the even physical register file. Per block 409, for each relevant set indicator, the corresponding source register in the odd physical register file may be treated as an undefined value for the purposes of the first operation. In some embodiments, this may be done, for example, by using register override circuit 223 of FIG. 2 in conjunction with indicator column 290.

Once each appropriate physical register has been designated as an undefined value for the purposes the first operation (or any time following the completion of block 408 if no relevant indicators are set), the even and odd execution slices may be used together, per block 410, to perform the first operation. Per block 411, the result of the first operation may be split, with the lower portion of the result being written to the target register in the even physical register file and an upper portion of the result being written to the target register in the odd physical register file. Finally, per block 412, the indicator for the target register in the odd physical register file may be cleared (assuming it was previously set). The fact that the indicator is cleared may serve as a signal, during future operations, that the content of the target register in the odd physical register file is not a duplicate of the content of the target register in the even physical register file.

Returning now to FIG. 2, an example use of a processor core 200 to process an example instruction will be described. For this example, it is assumed that the physical register files 211 and 221 are constructed in accordance with the embodiment of block 231. This example begins with the instruction being received at processor core 200. The example instruction specifies a smaller/scalar operation to be performed, with FPR 2 as a target register for the operation, FPR 3 as a first source register for the operation, and VSX 1 as a second source register for the operation. It is determined that the operation requires only one execution slice 210 or 220 because it is a smaller/scalar operation (i.e., an operation specified by an instruction of the first set of instructions).

Continuing the example, by reviewing the instruction streams being processed by processor core 200, it is determined that the operation that resulted in the data written in both physical registers 273 and 283 (i.e., FPR 3) required only one execution slice for its performance (i.e., that the instruction specifying this operation was also of the first set of instructions). It is further determined that the operation that resulted in the data written to even physical register 271 and odd physical register 281 (i.e., VSX 1) required both execution slices 210 and 220 for its performance (i.e., that the instruction specifying this operation was of the second set of instructions). Based on the determination made relating to the second source register VSX 1, the example instruction may be dispatched to the even execution slice 210, rather than the odd execution slice 220. Next, the processing unit 212 of even execution slice 210 may perform the operation specified in the example instruction using the data written in physical registers 273 and 271. The result of the operation may be written to the target register FPR 2 in both physical register files, with a first copy of the result being written to physical register 272 and a duplicate, second copy of the result being written to physical register 282. Finally, because the operation required only one execution slice and, therefore, the contents of physical registers 272 and 282 are duplicates, the indicator bit of indicator column 290 corresponding with physical register 282 may need to be set (because it is currently depicted as cleared in the diagram of FIG. 2). This completes this example.

Another example of the use of processor core 200 of FIG. 2, using a different example instruction, will be provided. In this second example, it is once again assumed that the physical register files 211 and 221 are constructed in accordance with the embodiment of block 231. This second example begins with a second instruction being received at processor core 200. The second instruction specifies that the operation to be performed is a larger/vector operation, with VSX 3 as the target register for the operation, and with FPR 4 as the single source register for the operation.

For this second example, it is determined that the operation specified in the second instruction requires both even execution slice 210 and odd execution slice 220 (because it is of the second set of instructions). Based on this determination, the second instruction may be dispatched to both execution slices. Next, the appropriate indicator bit may be checked. In this second example, the appropriate indicator bit may be the bit in indicator column 290 corresponding to physical register 284 (i.e., the source register in the odd physical register file 221). The fact that this indicator bit is set may be detected. Based on this detection, the content of physical register 284 may be treated as an undefined value (e.g., all zeroes), for the purposes of the operation specified in the second instruction. In this example, this may be done using register override circuit 223, which overrides the value written into physical register 284 for this operation.

Using the processing units 212 and 222 the operation may be performed using the VSX 4 (lower portion) (from physical register 274) and the undefined value. The result of the operation of this second example may be written to the target register VSX 3, with a lower portion of the result being written to physical register 273 and the upper portion of the result being written to physical register 283 (i.e., the target register in each of the physical register files 211 and 221, respectively). Finally, because the operation of the second instruction required both execution slices and the result may be split between the physical register files, the indicator bit in column 290 corresponding to physical register 283 may be cleared. This completes the second example.

It is contemplated that some or all of the steps of some of the embodiments of methods described herein may be performed in alternative orders or may not be performed at all; furthermore, multiple steps may occur at the same time or as an internal part of a larger process. For example, per blocks 406 and 407 of method 400 of FIG. 4, a result of an operation may, in some embodiments, be written to target registers in both physical register files prior to, subsequent to, or contemporaneously with the setting of the indicator for the target register in the odd physical register file.

Furthermore, with regard to computer architecture, the embodiments of processor cores described and depicted herein may include representative major components of a processor core usable as part of a computer system. In some embodiments, however, processor cores may employ individual components that may have greater complexity than those depicted herein, and components other than or in addition to those shown in the figures may be present, and the number, type, and configuration of such components may vary.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    an even execution slice having an even physical register file, the even execution slice configured to perform operations specified in a first set of instructions on data from the even physical register file;
    an odd execution slice having an odd physical register file, the odd execution slice configured to perform operations specified in the first set of instructions on data from the odd physical register file,
    wherein the even and odd execution slices are together configured to perform operations specified in a second set of instructions on data stored across both the even and odd physical register files; and
    logic circuitry configured to:
        receive a first instruction specifying an operation, a target register, and at least one source register, the first instruction being of the first set of instructions;
        identify a second instruction upon which content of the at least one source register depends;
        determine that the second instruction is of the second set of instructions;
        dispatch, in response to the determining, the first instruction to the even execution slice;
        perform, using the even execution slice, the operation using content of the at least one source register in the even physical register file to produce a result;
        write a first copy of the result to the target register in the even physical register file;
        write a second copy of the result to the target register in the odd physical register file;
        set an indicator;
        receive a third instruction specifying a second set of operations, and a second at least one source register, the second at least one source register being the target register;
        determine that the third instruction is of the second set of operations;
        dispatch, in response to the determining that the third instruction is of the second set of operations, the third instruction to the even execution slice and the odd execution slice;
        detect that the indicator is set;
        treat, in response to the detecting, content of the second at least one source register in the odd physical register file as an undefined value for the purposes of the second operation, the content of the second at least one source in the odd physical register file being the second copy of the result; and
        perform, using the even execution slice and the odd execution slice, the second operation using content of the second at least one source register in the even physical register file and the undefined value to produce a second result.

2. The system of claim 1, wherein the second instruction specifies a second operation and a second target register, the second target register being the at least one source register, and wherein the logic circuitry is further configured to:
    receive the second instruction;
    perform, using the even execution slice and the odd execution slice, the second operation to produce a second result;
    write a copy of a lower portion of the second result to the second target register in the even physical register file, the copy of the lower portion being the content of the at least one source register in the even physical register file; and
    write a copy of an upper portion of the second result to the second target register in the odd physical register file.

3. The system of claim 2, wherein the logic circuitry is further configured to:
    clear, in association with writing the copy of the upper portion, an indicator, the indicator corresponding with the target register in the odd physical register file.

4. The system of claim 1, wherein the logic circuitry is further configured to:
    receive a third instruction specifying a second at least one source register, the second at least one source register being the target register;
    determine that the first instruction and the third instruction are both of the first set of instructions; and
    dispatch, in response to the determining that the first instruction and the third instruction are both of the first set of instructions, the third instruction to one of the even execution slice and the odd execution slice.

5. The system of claim 1, wherein the logic circuitry is further configured to:
    set, in association with writing the first copy of the result, an indicator, the indicator corresponding with the target register in the odd physical register file.

6. A system comprising:
    an even execution slice having an even physical register file, the even execution slice configured to perform operations specified in a first set of instructions on data from the even physical register file;

an odd execution slice having an odd physical register file, the odd execution slice configured to perform operations specified in the first set of instructions on data from the odd physical register file, wherein the even and odd execution slices are together configured to perform operations specified in a second set of instructions on data stored across both the even and odd physical register files; and logic circuitry configured to:
  receive an instruction specifying an operation and at least one source register, the instruction being of the second set of instructions;
  detect that an indicator is set;
  treat, in response to the detecting, content of the at least one source register in the odd physical register file as an undefined value for the purposes of the operation; and
  perform, using the even execution slice and the odd execution slice, the operation using content of the at least one source register in the even physical register file and the undefined value to produce a result.

7. The system of claim 6, wherein the logic circuitry is further configured to:
  receive a second instruction specifying a second operation and a target register, the second instruction being of the first set of instructions, and the target register being the at least one source register;
  perform the second operation using one of the even execution slice and the odd execution slice to produce a second result;
  write a first copy of the second result to the target register in the even physical register file, the first copy being the content of the at least one source register in the even physical register file;
  write a second copy of the second result to the target register in the odd physical register file, the second copy being the content of the at least one source register in the odd physical register file; and
  set the indicator.

8. The system of claim 6, wherein the indicator is at least one bit which corresponds with the at least one source register in the odd physical register file.

9. The system of claim 6, wherein the instruction further specifies a second source register, wherein the indicator corresponds with the at least one source register in the odd physical register file, wherein the performing the operation further uses content of the second source register in the even physical register file and content of the second source register in the odd physical register file to produce the result, and wherein the logic circuitry is further configured to:
  detect that a second indicator is clear, the second indicator corresponding with the second source register in the odd physical register file; and
  treat, in response to the detecting that the second indicator is clear, content of the second source register in the odd physical register file as itself for the purposes of the operation.

10. The system of claim 6, wherein the architecture further includes a second even execution slice having a second even physical register file and a second odd execution slice having a second odd physical register file, wherein the second even execution slice is configured to perform operations specified in the first set of instructions on data from the second even physical register file, wherein the second even and second odd execution slices are together configured to perform operations specified in the second set of instructions on data stored across both the second even and second odd physical register files, and wherein the even, second even, odd, and second odd execution slices are together configured to perform operations specified in a third set of instructions on data stored across all of the even, second even, odd, and second odd physical register files.

11. The system of claim 6, wherein the instruction further specifies a target register, and wherein the logic circuitry is further configured to:
  write a copy of a lower portion of the result to the target register in the even physical register file; and
  write a copy of an upper portion of the result to the target register in the odd physical register file.

12. The system of claim 11, wherein the indicator corresponds with the at least one source register in the odd physical register file, and wherein the logic circuitry is further configured to:
  clear, in association with writing the copy of the upper portion, a second indicator, the second indicator corresponding with the target register in the odd physical register file.

* * * * *